US008509845B2

(12) United States Patent
Park et al.

(10) Patent No.: US 8,509,845 B2
(45) Date of Patent: Aug. 13, 2013

(54) APPARATUS FOR IMPEDANCE MATCHING IN DUAL STANDBY PORTABLE TERMINAL AND METHOD THEREOF

(75) Inventors: Sung Won Park, Suwon-si (KR); Young Kwang Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1471 days.

(21) Appl. No.: 12/132,404

(22) Filed: Jun. 3, 2008

(65) Prior Publication Data

US 2009/0197638 A1 Aug. 6, 2009

(30) Foreign Application Priority Data

Feb. 5, 2008 (KR) .......................... 10-2008-0011624

(51) Int. Cl.
H04M 1/00 (2006.01)

(52) U.S. Cl.
USPC .............................. 455/553.1; 455/78; 455/73

(58) Field of Classification Search
USPC ..................... 455/552.1, 553.1, 550.1, 73, 78
See application file for complete search history.

(56) References Cited

U.S. PATENT DOCUMENTS

| | | | | |
|---|---|---|---|---|
| 5,212,813 A * | 5/1993 | Renaud | ............................. | 455/82 |
| 6,400,963 B1 * | 6/2002 | Glockler et al. | ........... | 455/553.1 |
| 6,466,768 B1 * | 10/2002 | Agahi-Kesheh et al. | ....... | 455/78 |
| 6,714,773 B1 * | 3/2004 | Ishida | ........................... | 455/272 |
| 6,804,261 B2 * | 10/2004 | Snider | ........................... | 370/478 |
| 6,990,357 B2 * | 1/2006 | Ella et al. | ................... | 455/553.1 |
| 7,142,884 B2 * | 11/2006 | Hagn | ........................ | 455/552.1 |
| 7,389,090 B1 * | 6/2008 | Kubota et al. | .................... | 455/82 |
| 7,483,716 B2 * | 1/2009 | Rooyen et al. | ............. | 455/550.1 |
| 7,664,528 B2 * | 2/2010 | van Rooyen | ............... | 455/553.1 |
| 7,761,061 B2 * | 7/2010 | Rofougaran et al. | ........... | 455/80 |
| 7,844,242 B2 * | 11/2010 | Rofougaran et al. | ......... | 455/333 |
| 7,912,435 B2 * | 3/2011 | Qi et al. | ........................ | 455/272 |
| 7,920,527 B2 * | 4/2011 | Rakshani et al. | ............. | 370/335 |
| 7,933,562 B2 * | 4/2011 | Rofougaran et al. | .......... | 455/80 |
| 8,068,790 B2 * | 11/2011 | Rofougaran | ..................... | 455/73 |
| 8,131,226 B1 * | 3/2012 | Kemmochi et al. | ............. | 455/83 |
| 2002/0107033 A1 * | 8/2002 | Kim | .............................. | 455/456 |
| 2002/0173337 A1 * | 11/2002 | Hajimiri et al. | ............... | 455/552 |
| 2003/0003952 A1 * | 1/2003 | Kim | .............................. | 455/552 |
| 2003/0125004 A1 * | 7/2003 | Tolson | ......................... | 455/296 |
| 2004/0132487 A1 * | 7/2004 | Kearns | ....................... | 455/552.1 |
| 2004/0224644 A1 * | 11/2004 | Wu et al. | .......................... | 455/88 |
| 2005/0037800 A1 * | 2/2005 | Shih | ........................... | 455/550.1 |
| 2005/0085260 A1 * | 4/2005 | Ella et al. | ................... | 455/552.1 |
| 2005/0233764 A1 * | 10/2005 | Solski et al. | ............... | 455/552.1 |

(Continued)

FOREIGN PATENT DOCUMENTS

CN 101098547 A 1/2008

Primary Examiner — Lewis West
(74) Attorney, Agent, or Firm — Jefferson IP Law, LLP

(57) ABSTRACT

The present invention relates to an apparatus for impedance matching in a dual standby portable terminal, and a method thereof. The apparatus for impedance matching is configured with first and second modules. The second module includes an antenna for radiating a radio frequency signal, a radio communication unit having a sending end for outputting a radio frequency signal and a receiving end for receiving a radio frequency signal, an impedance matching circuit unit having a specific impedance value, a switch unit for connecting one of the sending end, the receiving end, and the impedance matching circuit unit, to the antenna and a control unit for controlling the switch unit to selectively connect one of the sending end, the receiving end, and the impedance matching circuit unit, to the antenna.

20 Claims, 6 Drawing Sheets

(56) References Cited

U.S. PATENT DOCUMENTS

| | | | |
|---|---|---|---|
| 2006/0194550 A1* | 8/2006 | Block et al. | 455/78 |
| 2007/0135160 A1* | 6/2007 | Fabrega-Sanchez et al. | 455/553.1 |
| 2007/0298838 A1* | 12/2007 | Meiyappan et al. | 455/553.1 |
| 2008/0070620 A1* | 3/2008 | van Rooyen | 455/552.1 |
| 2008/0123580 A1* | 5/2008 | Vathulya | 370/314 |
| 2008/0136512 A1* | 6/2008 | Dow et al. | 330/51 |
| 2008/0139243 A1* | 6/2008 | Lin et al. | 455/553.1 |
| 2008/0261651 A1* | 10/2008 | Nakahashi et al. | 455/553.1 |
| 2008/0273579 A1* | 11/2008 | Rofougaran et al. | 375/219 |
| 2009/0054008 A1* | 2/2009 | Satou | 455/78 |
| 2009/0109880 A1* | 4/2009 | Kim et al. | 370/278 |
| 2009/0233642 A1* | 9/2009 | Zhitnitsky | 455/552.1 |
| 2010/0022197 A1* | 1/2010 | Kato et al. | 455/75 |

* cited by examiner

APPARATUS FOR IMPEDANCE MATCHING IN DUAL STANDBY PORTABLE TERMINAL AND METHOD THEREOF

PRIORITY

This application claims the benefit under 35 U.S.C. §119(a) of a Korean patent application filed in the Korean Intellectual Property Office on Feb. 5, 2008 and assigned Serial No. 2008-0011624, the entire disclosure of which is hereby incorporated by reference.

BACKGROUND OF THE INVENTION

1. Field of the Invention

The present invention relates to an apparatus for impedance matching in a dual standby portable terminal and a method thereof. More particularly, the present invention relates to an apparatus for impedance matching that enables improvement of radiation characteristics by matching the impedance of a module to an optimal value while another module is operating in a communication mode in a dual standby portable terminal providing at least a dual mode, and a method thereof.

2. Description of the Related Art

Over time, portable terminals have gained in both popularity and use. In light of their popularity, as well as user demand, portable terminals providing various additional functions are being developed. One such terminal that has recently come into the market is a dual mode portable terminal. A dual mode terminal uses a communication network that supports one or more radio communication protocols.

In comparison with a dual mode terminal, a conventional dedicated terminal, which supports only one radio communication system, can communicate with another terminal only in a service area of the corresponding radio communication system. However, with a dual mode portable terminal, for example a terminal that supports both a Code Division Multiple Access (CDMA) system and a Global System for Mobile Communications (GSM) system, the terminal can communicate with another terminal in either a CDMA or a GSM service area. Accordingly, the usability of the terminal is expanded.

In a conventional dual mode portable terminal, changing the terminal from one mode to another mode is complicated and requires time. For example, the system mode change may be executed using a menu selection after booting the portable terminal and entering an idle mode, all of which requires time and is an inconvenience for the user. To solve such inconvenience, a dual standby portable terminal that can simultaneously support two modes, for example both GSM and CDMA, has been suggested. In the dual standby portable terminal, a second call may be newly received by automatically changing a mode while a first call is being conducted.

A dual standby portable terminal having more than one mode generally has an antenna corresponding to each mode. Additionally, while executing one communication mode, the dual standby portable terminal continues to operate the other mode. Therefore, a problem of deteriorating radiation characteristics and reception sensitivity of an antenna in a communication mode may arise due to interference between the two antennas of the corresponding modes.

SUMMARY OF THE INVENTION

An aspect of the present invention is to address the above-mentioned problems and/or disadvantages and to provide at least the advantages described below. Accordingly, an aspect of the present invention is to provide an apparatus for impedance matching, and a method of matching the impedance of a module to an optimal value while another module is in a communication mode and of preventing deterioration of reception sensitivity and radiation characteristics caused by interruption between two modules in a dual standby portable terminal.

In accordance with an aspect of the present invention, an apparatus for impedance matching is provided. The apparatus includes first and second modules. The second module includes an antenna for radiating a radio frequency signal, a radio communication unit having a sending end for outputting a radio frequency signal and a receiving end for receiving a radio frequency signal, an impedance matching circuit unit having a specific impedance value, a switch unit for connecting one of the sending end, the receiving end, and the impedance matching circuit unit, to the antenna and a control unit for controlling the switch unit to selectively connect one of the sending end, the receiving end, and the impedance matching circuit unit, to the antenna.

In accordance with an aspect of the present invention, the control unit of the second module controls the switch unit to connect the receiving end of the second module to the antenna in a receiving slot time when the first module is executing communication.

In accordance with another aspect of the present invention, the control unit of the second module controls the switch unit to connect the sending end of the second module to the antenna in a transmitting slot time when the first module is executing communication.

In accordance with yet another aspect of the present invention, the control unit of the second module controls the switch unit to connect the impedance matching circuit unit of the second module to the antenna in any slot time excluding the transmitting and receiving slot times when the first module is executing communication.

In accordance with still another aspect of the present invention, the control unit of the second module controls the switch unit to connect the impedance matching circuit unit of the second module to the antenna when the second module is not in use.

The first and second modules may execute communication according to the same or a different radio communication protocol.

In accordance with an aspect of the present invention, the first module is a module for executing radio communication according to one of a Global System for Mobile Communications (GSM) and a Code Division Multiple Access (CDMA) protocol, and the second module is a module for executing radio communication according to a GSM protocol.

In accordance with another aspect of the present invention, the first module may include an antenna for radiating a radio frequency signal to the air, a radio communication unit having a sending end for outputting a radio frequency signal and a receiving end for receiving a radio frequency signal, an impedance matching circuit unit having a specific impedance value, a switch unit for connecting one of the sending end, the receiving end, and the impedance matching circuit unit, to the antenna and a control unit for controlling the switch unit to selectively connect one of the sending end, the receiving end, and the impedance matching circuit unit, to the antenna.

In accordance with an aspect of the present invention, if the first module is a module for executing radio communication according to a CDMA protocol, the control unit of the first module controls the switch unit of the first module to connect the radio communication unit of the first module to the antenna of the first module.

In accordance with another aspect of the present invention, if the first module is a module for executing radio communication according to a GSM protocol, the control unit of the first module controls the switch unit of the first module to connect one of the sending end, receiving end, and impedance matching circuit unit of the first module to the antenna of the first module.

In accordance with an aspect of the present invention, the first module may further include a Universal Subscriber Identity module (USIM) unit. The first module executes, if a USIM for GSM is attached, radio communication according to a GSM protocol, and executes, if a USIM for CDMA is attached, radio communication according to a CDMA protocol.

In accordance with another aspect of the present invention, the first module is a module for executing radio communication according to a CDMA protocol and the second module is a module for executing radio communication according to a GSM protocol, wherein the first module includes an antenna for radiating a radio frequency signal, a radio communication unit having a sending end for outputting a radio frequency signal and a receiving end for receiving a radio frequency signal, and a control unit for executing radio communication through the radio communication unit.

In accordance with an aspect of the present invention, a method of impedance matching in a dual standby portable terminal is provided. The method includes executing radio communication using a first module of the portable terminal, identifying a slot time of a second module of the portable terminal and connecting one of a sending end, a receiving end, and an impedance matching circuit unit of the second module to an antenna of the second module according to the identified slot time.

In accordance with an aspect of the present invention, if the slot time is for receiving a signal, the receiving end of the second module is connected to the antenna of the second module.

In accordance with another aspect of the present invention, if the slot time is for transmitting a signal, the sending end of the second module is connected to the antenna of the second module.

In accordance with still another aspect of the present invention, if the slot time is any other than a slot time for transmitting and receiving a signal, the impedance matching circuit unit of the second module is connected to the antenna of the second module.

In accordance with yet another aspect of the present invention, when communication is being executed by one module in a dual standby portable terminal, performance of the module can be improved by matching the impedance of another module to an optimal value.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

Figure 1A:
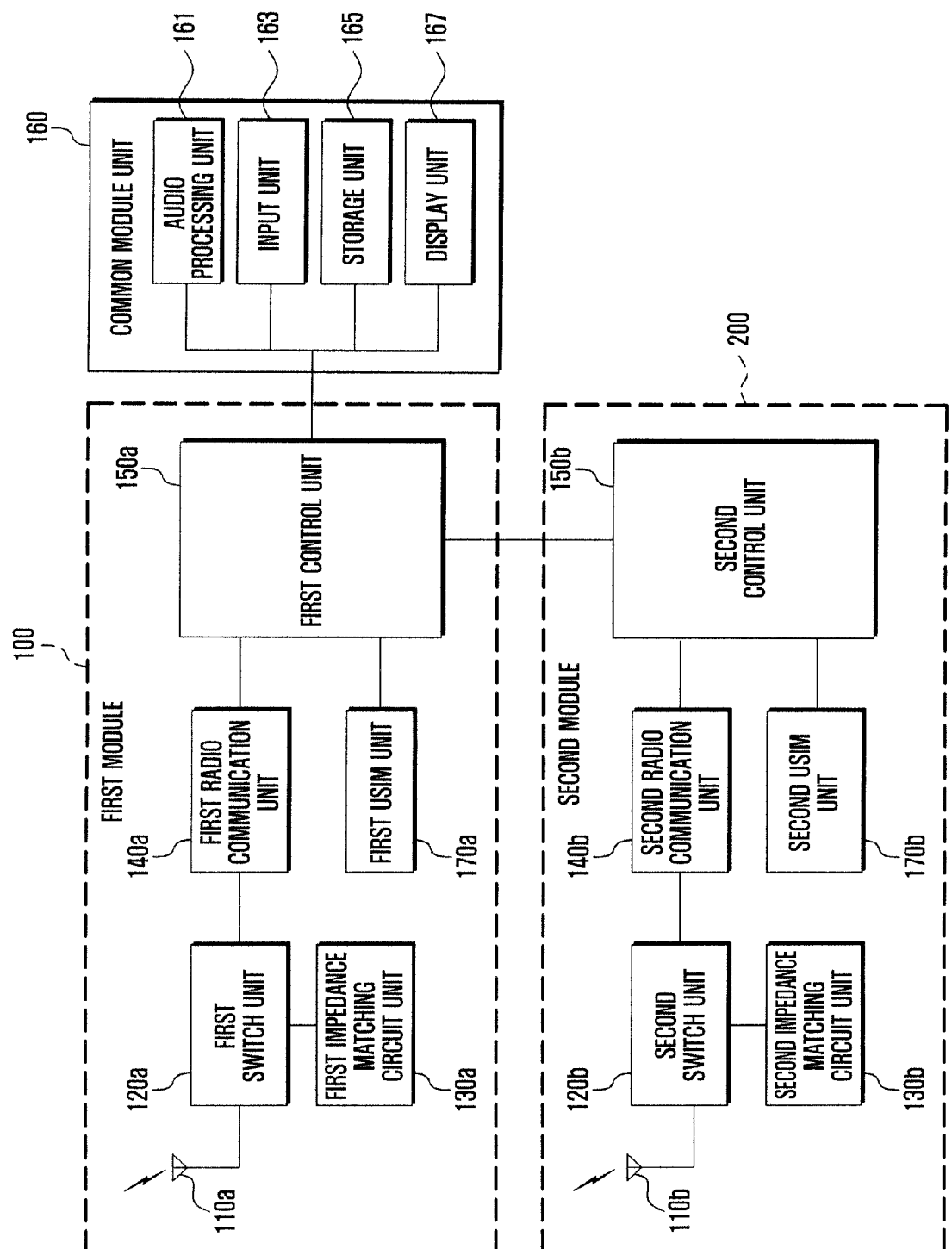
FIGS. 1A and 1B are block diagrams illustrating a schematic configuration of a portable terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In the following description, a mobile communication terminal is used as an example of a dual standby portable terminal. However, it is to be understood that the present invention is not limited thereto. That is, embodiments of the present invention may be applied to all portable information communication and multimedia equipment, and their variants, such as a mobile communication terminal, a digital broadcast terminal, a Personal Digital Assistant (PDA), a Smart Phone, an International Mobile Telecommunication 2000 (IMT-2000) terminal, a Wideband Code Division Multiple Access (WCDMA) terminal, and a Universal Mobile Telecommunication Service (UMTS) terminal, preferably providing at least a dual mode and a dual standby function with the dual mode.

Hereinafter, an apparatus for impedance matching of a dual standby portable terminal (hereafter, "portable terminal") according to an exemplary embodiment of the present invention is described. A schematic configuration of a portable terminal according to an exemplary embodiment of the present invention is described referring to the block diagrams of FIGS. 1A and 1B.

A dual standby portable terminal characteristically includes function modules corresponding to each of a plurality of the same or different radio communication protocols, and the terms "first" and "second" are used for each function module, such as a first module 100 and a second module 200. For example, a module denoted with "first" may be a function module using a GSM protocol and a module denoted with "second" may be a function module using a GSM protocol or a CDMA protocol. Alternatively, the terms may be used in reverse order. In the description of the function module of FIGS. 1A and 1B, the term "corresponding" is used to mean a correspondence between function modules denoted with "first" and a correspondence between function modules denoted with "second". If it is not necessary to distinguish two components executing the same function and operation, the terms of "first" and "second" may be omitted. Additional symbols "a" and "b" are used for reference numbers in the drawings if it is necessary to distinguish two components, and the additional symbols "a" and "b" are not used if not necessary.

Figure 1B:
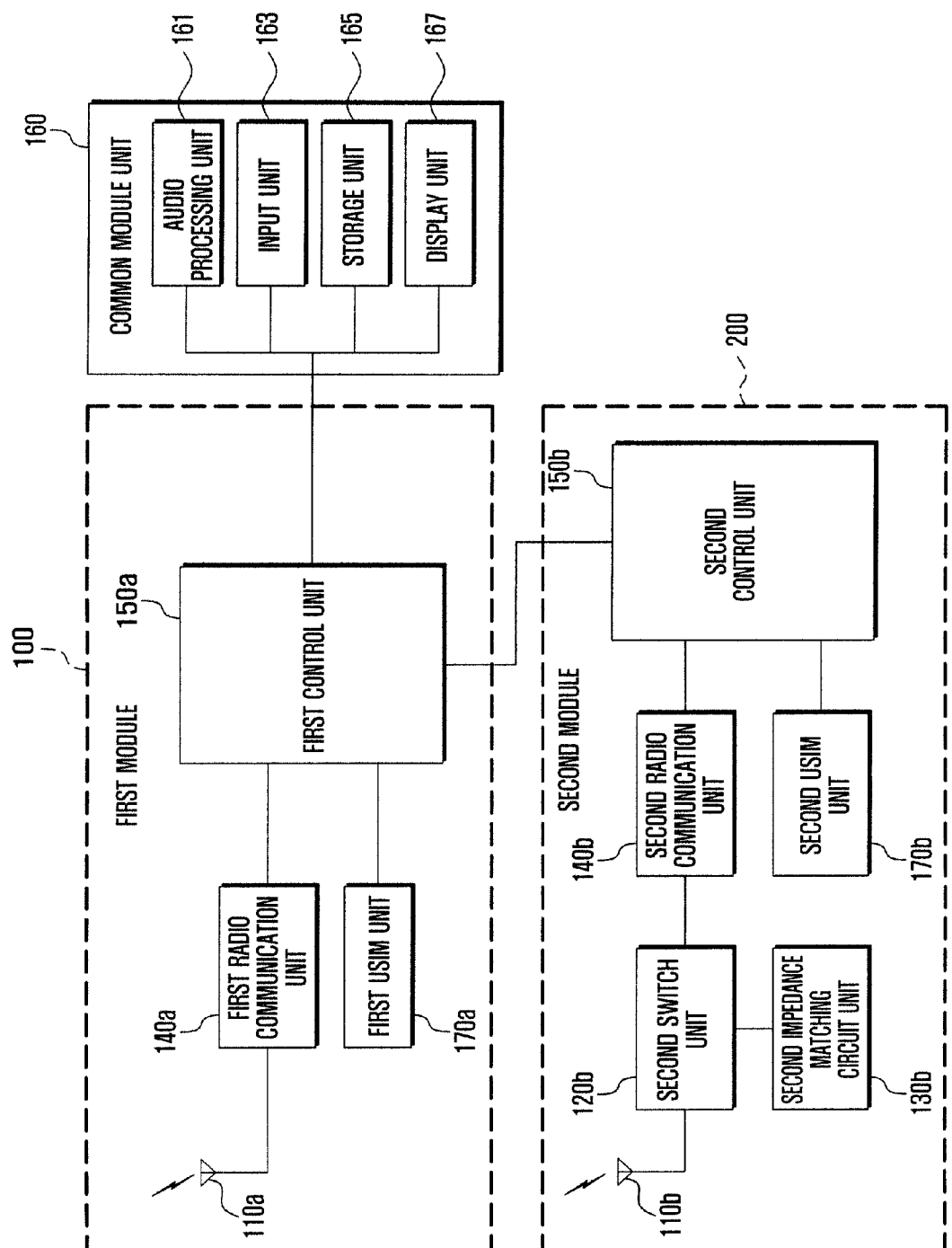

FIG. 1A illustrates a schematic configuration of a portable terminal having a first module 100 supporting CDMA/GSM radio communication protocols and a second module 200 supporting a GSM protocol. In an exemplary embodiment of the present invention, a portable terminal having this configuration is called "CDMA/GSM-GSM dual standby portable terminal". FIG. 1B illustrates a schematic configuration of a portable terminal having a first module 100 supporting a CDMA radio communication protocol and a second module 200 supporting a GSM protocol. In an exemplary embodiment of the present invention, a portable terminal having this configuration is called "CDMA-GSM dual standby portable terminal".

Referring to FIG. 1A, a portable terminal according to an exemplary embodiment of the present invention includes a first antenna 110a, a second antenna 110b, a first switch unit 120a, a second switch unit 120b, a first impedance matching circuit unit 130a, a second impedance matching circuit unit 130b, a first radio communication unit 140a, a second radio communication unit 140b, a first control unit 150a, a second control unit 150b, and a common module unit 160. In particular, the common module unit 160 includes an audio processing unit 161, an input unit 163, a storage unit 165, and a display unit 167. Optionally, the portable terminal may further include a first Universal Subscriber Identity Module (USIM) unit 170a and a second USIM unit 170b.

The first antenna 110a and the second antenna 110b each transmit and receive a radio frequency signal corresponding to each antenna. In particular, the first antenna 110a and the second antenna 110b each selectively receive a radio frequency signal according to a frequency of the radio communication protocol of their corresponding modules. Similarly, the first antenna 110a and the second antenna 110b each transmit a radio frequency signal of a frequency corresponding to their respective modules.

The first switch unit 120a and the second switch unit 120b each include a plurality of ports. Each port may be connected to a sending end Tx and a receiving end Rx of the first impedance matching circuit unit 130a and the second impedance matching circuit unit 130b, and of each of the first radio communication unit 140a and the second radio communication unit 140b, corresponding to the first switch unit 120a and the second switch unit 120b, respectively. As will be described in greater detail below, each connection is made selectively according to a slot. That is, a communication frame is divided into a plurality of slots according to time by a time sharing system wherein a portion of the plurality of slots may be allocated to an operation of transmission or reception. Furthermore, the first switch unit 120a and the second switch unit 120b have different connections according to the allocated slot times. That is, during transmission and reception, the first switch unit 120a and the second switch unit 120b are connected to the corresponding first antenna 110a and second antenna 110b, and to the corresponding first radio communication unit 140a and second radio communication unit 140b. Particularly, in a slot time of receiving a specific signal, the first switch unit 120a and the second switch unit 120b are connected to receiving ends Rx of the corresponding first radio communication unit 140a and second radio communication unit 140b, and to the corresponding first antenna 110a and second antenna 110b. Further, in a slot time of transmitting a specific signal, the first switch unit 120a and the second switch unit 120b are connected to sending ends Tx of the corresponding first radio communication unit 140a and second radio communication unit 140b, and to the corresponding first antenna 110a and second antenna 110b.

When not transmitting or receiving a signal, the first switch unit 120a and the second switch unit 120b are connected to the corresponding first impedance matching circuit unit 130a and second impedance matching circuit unit 130b, and to the corresponding first antenna 110a and second antenna 110b, respectively.

The first radio communication unit 140a and the second radio communication unit 140b perform communication by transmitting/receiving a signal, such as user data and voice, to/from another portable terminal. The first radio communication unit 140a and the second radio communication unit 140b may each include a sending end Tx for converting and amplifying a modulated signal received from the corresponding first control unit 150a and second control unit 150b to a radio frequency signal, and a receiving end Rx for receiving a radio frequency signal, low noise amplifying the received radio frequency signal, sequentially converting the received radio frequency signal to a baseband, and outputting the converted signal to the respective control unit 150a and 150b.

When processing a voice signal for transmission by radio communication, the first control unit 150a and the second control unit 150b convert and modulate a voice signal received from the audio processing unit 161 through coding and interleaving, and output the converted and modulated signal to the corresponding first radio communication unit 140a and second radio communication unit 140b. Additionally, for reception by radio communication, the first control unit 150a and the second control unit 150b generate a voice signal from a signal received from the corresponding first radio communication unit 140a and second radio communication unit 140b through demodulating, equalizing, decoding, and deinterleaving, and output the generated voice signal to the audio processing unit 161. To perform these functions, the first control unit 150a and the second control unit 150b may include a modem and a codec. Hereto, the codec may include a data codec for processing packet data, an audio codec for processing an audio signal such as a voice signal, and a video codec for processing a video signal.

In an exemplary implementation, the first control unit 150a can perform radio communication by using either of two radio communication protocols. When performing radio communication by using a CDMA protocol, the first control unit 150a maintains a connection state between the first radio communication unit 140a and the first antenna 110a by controlling the first switch unit 120a.

The audio processing unit 161 has a speaker and a microphone (not shown). Using the speaker, the audio processing unit plays an audio signal output by the first control unit 150a. Also, the audio processing unit 161 outputs an audio signal, such as a voice signal, input through the microphone to the first control unit 150a.

The input unit 163 includes a plurality of input keys and function keys for a user to input alphanumeric characters and for setting various functions. The function keys may include direction keys, side keys, and shortcut keys, which perform specific functions individually. Additionally, the input unit 163 outputs a key signal related to user setting and function control of the portable terminal to the first control unit 150a. In an exemplary embodiment, the input unit 163 may include a touch sensitive input device such as a touch screen either in place of or in addition to the plurality of input and function keys.

The storage unit 165 stores application programs for functional operations according to an exemplary embodiment of the present invention, and information such as downloaded content and data created by a user. The storage unit 165 may include a program area and a data area. The program area stores an Operating System (OS) for booting operation of the portable terminal and application programs necessary for various functions of the portable terminal. The data area stores user data created during the use of the portable terminal.

The display unit 167 visually provides the user with information, such as a menu of the portable terminal, data input by the user, function settings and the like. The display unit 167 may be formed with a Liquid Crystal Display (LCD).

In an exemplary dual standby portable terminal, first control unit 150*a* and second control unit 150*b* both use the common module unit 160. One of the first control unit 150*a* and the second control unit 150*b* operates as a master device, and the other operates as a slave device. In FIG. 1A, the first control unit 150*a* is shown operating as a master device. However, this is merely for example and the second control unit 150*b* may operate as a master device also.

In the case that the first control unit 150*a* operates as a master device and the second control unit 150*b* operates as a slave device, the first control unit 150*a* directly controls the common module unit 160. For example, the first control unit 150*a* controls each function of the portable terminal according to a signal input through the input unit 163, such as a key input signal or a touch event of a touch screen. Information according to execution of a function, such as a current status and a user menu, is displayed on the display unit 167 or stored in the storage unit 165. Also, the second control unit 150*b* may indirectly control the common module unit 160 through the first control unit 150*a*.

The first USIM unit 170*a* and second USIM unit 170*b* are optional components and may be included if the corresponding module 100 or 200, respectively, requires a USIM. The first USIM unit 170*a* and the second USIM unit 170*b* may perform a function of an IC card (ICC) and may further include a storage unit and an arithmetic unit. The storage unit may include a Random Access Memory (RAM) and a Read Only Memory (ROM), and the arithmetic unit is preferably a Central Processing Unit (CPU). The first USIM unit 170*a* and the second USIM unit 170*b* may be installed detachably, and may be a Universal IC Card (UICC). The first USIM unit 170*a* and the second USIM unit 170*b* may integrate a service identifier used for authentication, encryption, and tunneling of encryption for radio communication when connecting to a base station.

In a CDMA/GSM-GSM dual standby portable terminal having the configuration illustrated in FIG. 1A, when the portable terminal is used as a GSM-GSM dual standby portable terminal, the first USIM unit 170*a* and the second USIM unit 170*b* may each be attached as a USIM unit for GSM. When the portable terminal is used as a CDMA-GSM dual standby portable terminal, the first USIM unit 170*a* may be attached as a USIM unit for CDMA and the second USIM unit 170*b* may be attached as a USIM unit for GSM.

FIG. 1B shows an exemplary portable terminal having a CDMA-GSM mode, in which the configuration of a second module 200 is substantially identical to that of the second module 200 illustrated in FIG. 1A.

As further illustrated in FIG. 1B, a first module 100 using CDMA as a radio communication protocol includes a first antenna 110*a*, a first radio communication unit 140*a* connected to the first antenna 110*a*, and a first control unit 150*a* and a common module unit 160 connected to the first radio communication unit 140*a*. Optionally, the first module 100 may further include a first USIM unit 170*a*.

Hereinafter, a status of operating as a GSM-GSM dual standby portable terminal is called "GSM-GSM mode" and a status of operating as a CDMA-GSM dual standby portable terminal is called "CDMA-GSM mode". In an exemplary CDMA/GSM-GSM dual standby portable terminal of FIG. 1A, the first control unit 150*a* controls to connect the first antenna 110*a* to the first radio communication unit 140*a* when operating in a CDMA-GSM mode.

Although not illustrated in the drawing, a common module of the portable terminal according to an exemplary embodiment of the present invention may further include various units having additional functions, such as a broadcasting signal reception module, camera module, recharging terminal, and digital audio player module such as an MP3 module. With a trend of digital equipment convergence, many variations and modifications of portable equipment have been made. Accordingly, those skilled in the art may understand that many optional units, such as the above units, may be included in a portable terminal according to the present invention.

Figure 2:
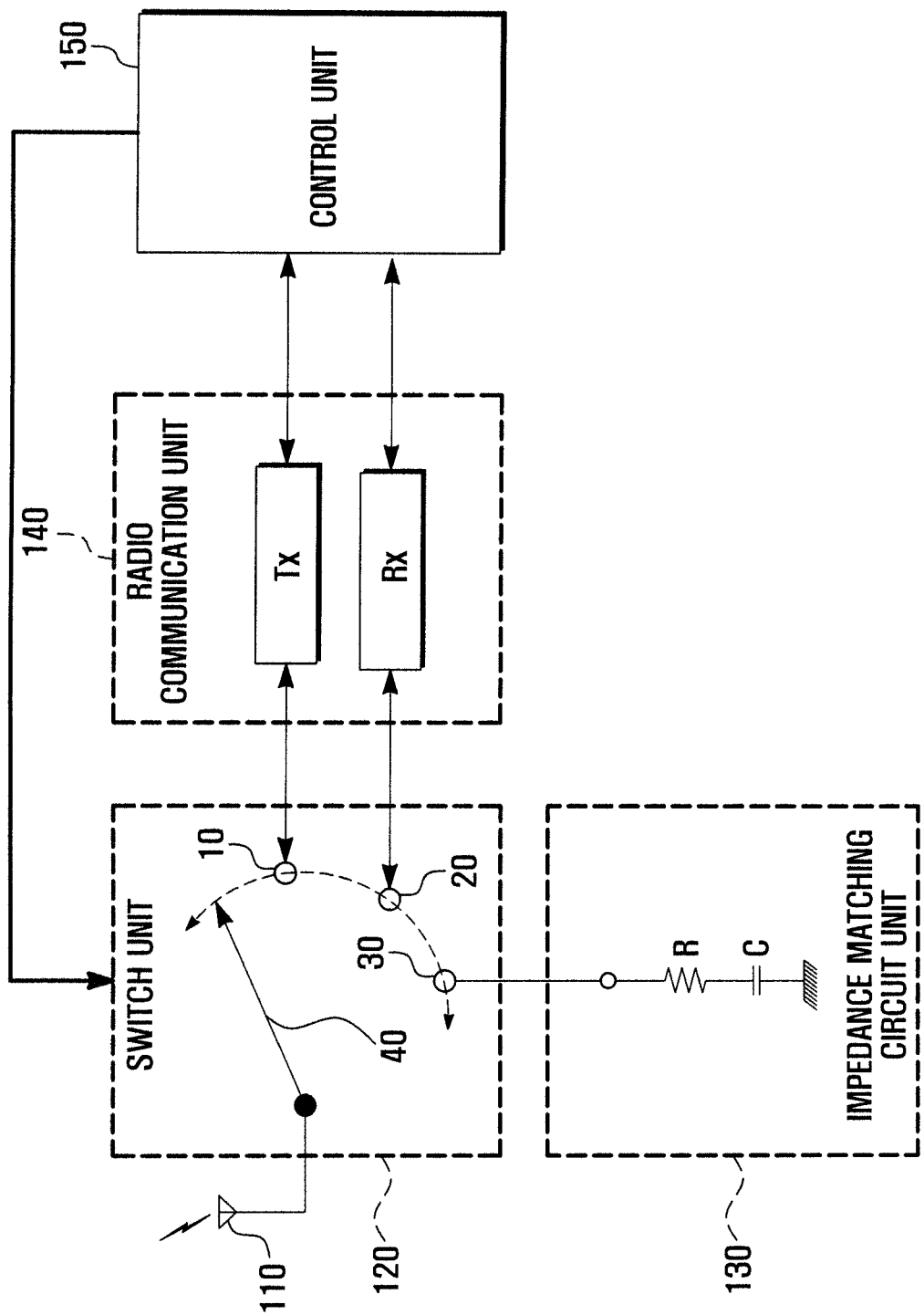
FIG. 2 is a block diagram illustrating a configuration of an exemplary impedance matching unit used in the portable terminal of FIGS. 1A and 1B.
Figure 3:
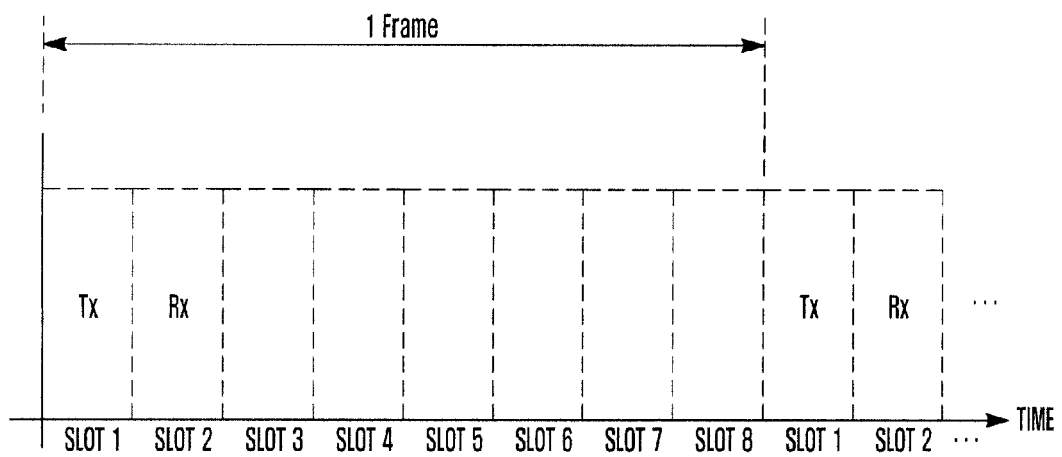
FIG. 3 is a graph used for explanation of impedance matching in the portable terminal of FIGS. 1A and 1B.

An apparatus for impedance matching in a portable terminal according to an exemplary embodiment of the present invention is described in more detail hereafter. FIG. 2 is a block diagram illustrating a configuration of an exemplary impedance matching unit used in the portable terminal of FIGS. 1A and 1B. In FIG. 2, the corresponding components of the modules operate in an identical manner, as described above, and therefore the terms "first" and "second" and reference symbols "a" and "b" are not used. FIG. 3 is a graph used for explanation of impedance matching in the portable terminal of FIGS. 1A and 1B.

As illustrated in FIG. 2, an exemplary impedance matching unit includes an antenna 110, a switch unit 120, an impedance matching circuit unit 130, a radio communication unit 140, and a control unit 150.

The switch unit 120 connects the antenna 110 to a sending end Tx and a receiving end Rx of the radio communication unit 140, or to the impedance matching circuit unit 130. For this, the switch unit 120 has a plurality of ports and a switch 40 for selecting a port. A first port 10, second port 20, and third port 30 are shown in the drawing. The first port 10 is connected to the sending end Tx of the radio communication unit 140. The second port 20 is connected to the receiving end Rx of the radio communication unit 140. The third port 30 is connected to the impedance matching circuit unit 130.

Accordingly, if one of the first port 10, the second port 20, and the third port 30 is selected by the switch 40 according to control of the control unit 150, the antenna 110 is connected to the sending end Tx, the receiving end Rx, or the impedance matching circuit unit 130, respectively. This method of switch operation is substantially identical both in the first switch unit 120*a* and in the second switch unit 120*b*.

Connection between an antenna and an impedance matching circuit is controlled according to a slot of a communication frame. A method of impedance matching according to an exemplary embodiment of the present invention is described hereinafter.

FIG. 3 is a graph showing that the time corresponding to one communication frame is divided into 8 sections or slots (Slot 1 to Slot 8). The division of slot time is determined by a base station serving the modules 100 and 200. For sake of example, it is assumed that the portable terminal transmits a signal for a time duration of Slot 1 and receives a signal for a time duration of Slot 2. Accordingly, the switch unit 120 selects the first port 10 for the time duration of Slot 1, and thereby the antenna 110 is connected to the sending end Tx. Furthermore, the switch unit 120 selects the second port 20 for the time duration of Slot 2, and thereby the antenna 110 is connected to the receiving end Rx. For the remaining time slots when the portable terminal is neither transmitting nor receiving, in this example Slot 3 to Slot 8, the switch unit 120 selects the third port 30 and thereby the antenna 110 is connected to the impedance matching circuit unit 130.

In an exemplary implementation, the impedance matching circuit unit 130 may include a passive device such as a resistor, a capacitor, and a conductor, and an active device such as a transistor. As illustrated in FIG. 2, an exemplary impedance matching circuit is configured with passive devices including a resistor R and a capacitor C. For example, a 50 Ω resistor and a 100 pF capacitor are used. Of course, this is merely for example and the values of the resistor and capacitor that give an optimal impedance matching effect are selected, which may vary according to the environment of radio communication.

According to an exemplary embodiment of the present invention, when one of the first module 100 and the second module 200 is executing communication, the switch unit 120 of the other module executes impedance matching by making a connection for each appropriate slot time. That is, the switch unit 120 of the other module connects the antenna 110 to the sending end Tx for a transmitting slot time and connects the antenna 110 to the receiving end Rx for a receiving slot time. Further, the switch unit 120 of the other module connects the antenna 110 to the impedance matching circuit unit 130 for the slot time excluding the transmitting and receiving slot times.

For example, if it is assumed that the portable terminal is executing communication using the first module, a second switch unit 120b connects a second antenna 110b to a second impedance matching circuit unit 130b for the time duration from Slot 3 to Slot 8. Accordingly, during communication of the dual standby portable terminal, deterioration of radiation characteristics of the first antenna 110a and the second antenna 110b due to interference between them may be prevented. This method can also be applied to communication by using the second module 200 in a GSM mode. That is, if it is assumed that the portable terminal is executing communication using the second module 200, a first switch unit 120a connects a first antenna 110a to a first impedance matching circuit unit 130a for the time duration from Slot 3 to Slot 8.

Table 1 shows improvement of radiation characteristics when using impedance matching according to exemplary embodiments of the present invention.

Here, 'TIS' is an abbreviation of 'Total Isotropic Sensitivity' and indicates "reception sensitivity" measured at all points around a portable terminal to evaluate reception performance of the terminal. 'TRP' is an abbreviation of 'Total Radiated Power' and indicates "radiation power" measured at all points around a portable terminal to evaluate overall characteristics of the terminal. A unit "dbm" is used for both items.

TABLE 1

| Case | Second module 200 GSM | First module 100 CDMA (TIS/TRP) | First module 100 GSM (TIS/TRP) |
| --- | --- | --- | --- |
| 1 | Second module detached | 107.5/19.0 | 106.3/29.5 |
| 2 | Matched to open state | 105.0/17.5 | |
| 3 | Matched to short state | | 103.5/27.0 |
| 4 | Matched to 50 Ω | 107.0/19.0 | |
| 5 | Matched to 50 Ω | | 105.7/29.2 |

Table 1 shows reception sensitivity and radiation power of the first module 100 measured according to impedance matching of the second module 200, when the first module is executing communication. Here, it is assumed that the second module 200 uses a GSM system.

Case 1 shows a test result for determining a basic value of communication quality. Cases 2 and 3 show values of the reception sensitivity and radiation power measured when impedance matching is performed according to the prior art. Cases 4 and 5 show values of the reception sensitivity and radiation power measured when impedance matching is performed according to exemplary embodiments of the present invention.

Case 1, as a basic communication quality, shows values of the reception sensitivity and radiation power measured when the second module 200 is detached and communication is performed only with the first module 100. In the case that the first module 100 is a CDMA system, the reception sensitivity and radiation power are respectively 107.5 dbm and 19.0 dbm.

In the case that the first module 100 is a GSM system, the reception sensitivity and radiation power are respectively 106.3 dbm and 29.5 dbm. These values indicate the reception sensitivity and radiation power provided by a portable terminal having a single mode.

Case 2 shows a test result in which the impedance of the second module 200 is matched to a value of an open state for a time duration excluding transmission and reception, and the first module 100 is a CDMA system. Here, reception sensitivity and radiation power of the first module 100 are respectively 105.0 dbm and 17.5 dbm, which are decreased respectively by 2.5 dbm and 1.5 dbm when compared to those of Case 1.

Case 4 shows a test result in which the second module 200 is connected to the second impedance matching circuit unit 130b for the time duration excluding transmission and reception, the impedance of the second module is matched to 50Ω, and the first module 100 is a CDMA system. Here, the reception sensitivity and radiation power of the first module 100 are respectively 107.0 dbm and 19.0 dbm. That is, the reception sensitivity is decreased by 0.5 dbm and the radiation power is maintained at the same value when compared to those of Case 1. However, comparing these values to those of Case 2, the reception sensitivity and radiation power show improvement respectively by 2.0 dbm and 1.5 dbm.

Case 3 shows a test result in which the impedance of the second module 200 is matched to a value of a short state for the time duration excluding transmission and reception, and the first module 100 is a GSM system. Here, the reception sensitivity and radiation power of the first module 100 are respectively 103.5 dbm and 27.0 dbm, which are decreased respectively by 2.8 dbm and 2.5 dbm when compared to those of Case 1.

Case 5 shows a test result in which the second module 200 is connected to the second impedance matching circuit unit 130b for the time duration excluding transmission and reception, the impedance of the second module 200 is matched to 50 Ω, and the first module 100 is a GSM system. Here, the reception sensitivity and radiation power of the first module 100 are respectively 105.7 dbm and 29.2 dbm, which are decreased respectively by 0.6 dbm and 0.3 dbm when compared to those of Case 1. However, these values show improvement respectively by 2.2 dbm and 2.2 dbm when compared to those of Case 3.

As described above, a dual standby portable terminal according to exemplary embodiments of the present invention can improve communication performance of a module by matching the impedance of the other module to an optimal value.

Hereinafter, a method of impedance matching in a portable terminal according to an exemplary embodiment of the present invention is described in detail referring to FIG. 4. Here it is assumed that the first module 100 uses one of a GSM system and a CDMA system and the second module 200 uses a GSM system. That is, cases of both a CDMA-GSM mode and a GSM-GSM mode are assumed.

Figure 4:
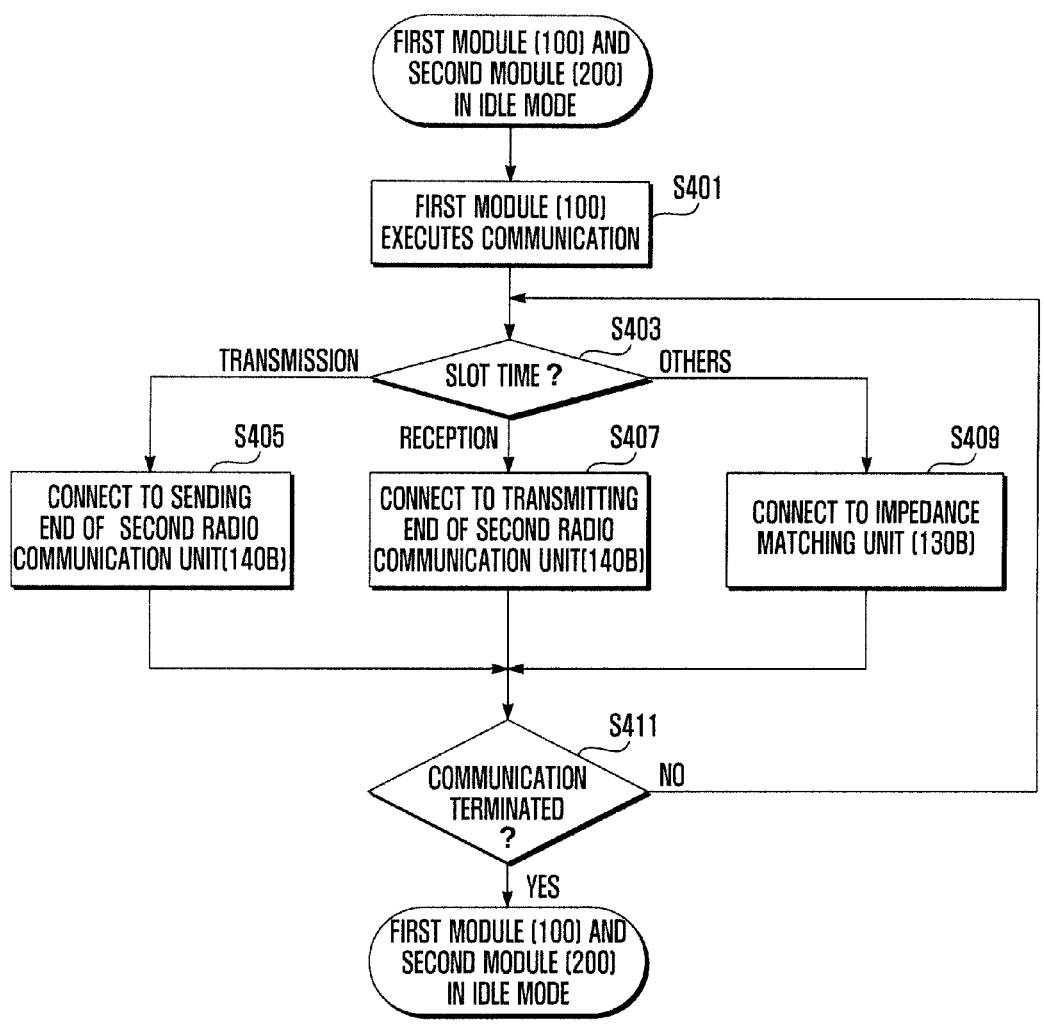
FIG. 4 is a flowchart illustrating a method of impedance matching in a portable terminal according to an exemplary embodiment of the present invention.

A method of impedance matching in a portable terminal according to an exemplary embodiment of the present invention is illustrated in the flowchart of FIG. 4.

Referring to FIG. 4, the first module 100 and the second module 200 are initially in an idle mode. The first module 100 performs communication according to a radio communication protocol in step S401. The second control unit 150b determines a function associated with a pre-allocated slot time in step S403. Here, it is assumed that a transmission function is allocated to Slot 1 and a reception function is allocated to Slot 2, as illustrated in FIG. 3.

If it is determined that the slot time is for transmission in step S403, the second control unit 150b controls the second switch unit 120b to connect the second antenna 110b to the sending end Tx of the second radio communication unit 140b in step S405. In the example, the second antenna 110b is connected to the sending end Tx of the second radio communication unit 140b for the time duration of Slot 1.

If it is determined that the slot time is for reception in step S403, the second control unit 150b controls the second switch unit 120b to connect the second antenna 110b to the receiving end Rx of the second radio communication unit 140b in step S407. In the example, the second antenna 110b is connected to the receiving end Rx of the second radio communication unit 140b for the time duration of Slot 2.

If it is determined that the slot time is for any other than transmission and reception in step S403, the second control unit 150b controls the second switch unit 120b to connect the second antenna 110b to the second impedance matching circuit unit 130b in step S409. In the example, the second antenna 110b is connected to the second impedance matching circuit unit 130b for the time duration from Slot 3 to Slot 8.

The second control unit 150b then identifies through the first control unit 150a whether the first module 100 terminates communication in step S411. If the communication is not terminated, the process returns to step S403 and the second control unit 150b repeats steps S403 to S411 as appropriate. If the communication is terminated at step S411, the first module 100 and the second module 200 return to the idle mode.

Figure 5:
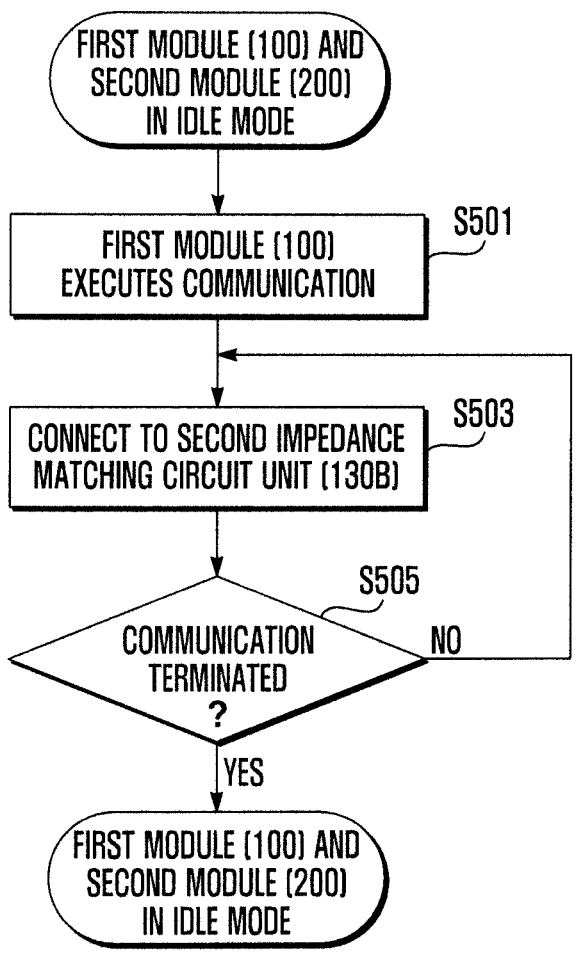
FIG. 5 is a flowchart illustrating another method of impedance matching in a portable terminal according to an exemplary embodiment of the present invention.

A method of impedance matching in a portable terminal according to another exemplary embodiment of the present invention is described in detail referring to FIG. 5.

Referring to FIG. 5, the first module 100 and the second module 200 are initially in an idle mode. The first module 100 performs communication according to a radio communication protocol in step S501. The second control unit 150b controls the second switch unit 120b to connect the second antenna 110b to the second impedance matching circuit unit 130b in step S503.

The second control unit 150b then identifies through the first control unit 150a whether the first module 100 terminates communication in step S505. If the communication is not terminated, the process returns to step S503 and the second control unit 150b repeats steps S503 to S505. If the communication is terminated at step S505, the first module 100 and the second module 200 return to the idle mode.

In this exemplary embodiment, when one module is executing a communication, the other module is connected to the impedance matching circuit unit 130. That is, it is assumed that, when one module is executing a communication, the searching of a base station or other communication functions can be temporarily interrupted.

In a situation in which the dual standby portable terminal cannot use any of the modules, an antenna 110 of a module is connected to the impedance matching circuit unit 130 while the module is not being used. Such a situation may be considered to be inevitable at some time, and may be, for example, a situation in which a module cannot be used because a USIM unit 170a or 170b of the corresponding module is not connected.

Although exemplary embodiments of the present invention have been described in detail hereinabove, it should be understood that many variations and modifications of the basic inventive concept herein described, which may appear to those skilled in the art, will still fall within the spirit and scope of the present invention as defined in the appended claims and their equivalents.

What is claimed is:

1. An apparatus for impedance matching in a dual standby portable terminal, the apparatus comprising:
   a first module; and
   a second module,
   wherein the second module comprises:
      an antenna for radiating a radio frequency signal;
      a radio communication unit comprising a sending end for outputting a radio frequency signal and a receiving end for receiving a radio frequency signal;
      an impedance matching circuit unit comprising a specific impedance value;
      a switch unit for connecting at least one of the sending end, the receiving end, and the impedance matching circuit unit to the antenna; and
      a control unit for controlling the switch unit to selectively connect the at least one of the sending end, the receiving end, and the impedance matching circuit unit to the antenna according to a slot time of a communication of the radio communication unit.

2. The apparatus of claim 1, wherein the control unit controls the switch unit to connect the receiving end to the antenna in a receiving slot time when the first module is executing a communication.

3. The apparatus of claim 1, wherein the control unit controls the switch unit to connect the sending end to the antenna in a transmitting slot time when the first module is executing a communication.

4. The apparatus of claim 1, wherein the control unit controls the switch unit to connect the impedance matching circuit unit to the antenna in any other slot time excluding transmitting and receiving slot times when the first module is executing a communication.

5. The apparatus of claim 1, wherein the control unit controls the switch unit to connect the impedance matching circuit unit to the antenna when the second module is not executing a communication.

6. The apparatus of claim 1, wherein the first and second modules execute communication according to at least one of a same and a different radio communication protocol.

7. The apparatus of claim 1, wherein the first module executes radio communication according to at least one of a Global System for Mobile Communications (GSM) and a Code Divisional Multiple Access (CDMA) protocol, and further wherein the second module executes radio communication according to the GSM protocol.

8. The apparatus of claim 1, wherein the first module comprises:
   another antenna for radiating a radio frequency signal;
   another radio communication unit having another sending end for outputting a radio frequency signal and another receiving end for receiving a radio frequency signal;
   another impedance matching circuit unit having a specific impedance value;
   another switch unit for connecting at least one of the other sending end, the other receiving end, and the other impedance matching circuit unit to the other antenna; and
   another control unit for controlling the other switch unit to selectively connect the at least one of the other sending end, the other receiving end, and the other impedance matching circuit unit to the other antenna.

9. The apparatus of claim 8, wherein, the other control unit controls the other switch unit to connect the other radio communication unit to the other antenna if the first module executes radio communication according to a Code Divisional Multiple Access (CDMA) protocol.

10. The apparatus of claim 8, wherein, the other control unit controls the other switch unit to connect the at least one of the other sending end, the other receiving end, and the other impedance matching circuit unit to the other antenna if the first module executes radio communication according to a Global System for Mobile Communications (GSM) protocol.

11. The apparatus of claim 8, further comprising a Universal Subscriber Identity Module (USIM) unit, wherein the first module executes radio communication according to a Global System for Mobile Communications (GSM) protocol if the USIM comprises a USIM for GSM, and executes radio communication according to a Code Divisional Multiple Access (CDMA) protocol if the USIM comprises a USIM for CDMA.

12. The apparatus of claim 1,
   wherein the first module executes radio communication according to a Code Divisional Multiple Access (CDMA) protocol and the second module executes radio communication according to a Global System for Mobile Communications (GSM) protocol, and
   wherein the first module comprises another antenna for radiating a radio frequency signal to the air, another radio communication unit comprising another sending end for outputting a radio frequency signal and another receiving end for receiving a radio frequency signal, and another control unit for executing radio communication through the other radio communication unit.

13. A method of impedance matching in a dual standby portable terminal, the method comprising:
   executing radio communication using a first module of the portable terminal;
   determining a function associated with a slot time of a second module of the portable terminal; and
   connecting at least one of a sending end, a receiving end and an impedance matching circuit unit of the second module to an antenna of the second module according to the determined function associated with the slot time.

14. The method of claim 13, wherein, if the slot time is for receiving a signal, the receiving end of the second module is connected to the antenna of the second module.

15. The method of claim 13, wherein, if the slot time is for transmitting a signal, the sending end of the second module is connected to the antenna of the second module.

16. The method of claim 13, wherein, if the slot time is any other than a slot time for transmitting or receiving a signal, the impedance matching circuit unit of the second module is connected to the antenna of the second module.

17. An apparatus for impedance matching in a dual standby portable terminal, the apparatus comprising:
   a first module; and
   a second module,
   wherein the second module comprises:
      an antenna;
      an impedance matching circuit unit comprising a specific impedance value;
      a switch unit; and
      a control unit for controlling the switch unit to selectively connect one of the impedance matching circuit unit and a signal path of the second module to the antenna in accordance with whether the second module is executing a scheduled communication.

18. The apparatus of claim 17, wherein the control unit controls the switch unit to connect the impedance matching circuit unit to the antenna when the second module is not executing the scheduled communication.

19. The apparatus of claim 17, wherein the control unit controls the switch unit to connect a receiving end of the second module to the antenna when the second module is receiving the scheduled communication.

20. The apparatus of claim 17, wherein the control unit controls the switch unit to connect a sending end of the second module to the antenna when the second module is transmitting the scheduled communication.

* * * * *